United States Patent
Williams

(10) Patent No.: US 9,448,406 B2
(45) Date of Patent: Sep. 20, 2016

(54) IMAGE DISPLAY SYSTEMS

(71) Applicant: BAE SYSTEMS plc, London (GB)

(72) Inventor: John Richard Williams, Rochester (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 14/375,210

(22) PCT Filed: Dec. 5, 2012

(86) PCT No.: PCT/GB2012/053010
§ 371 (c)(1),
(2) Date: Jul. 29, 2014

(87) PCT Pub. No.: WO2013/114066
PCT Pub. Date: Aug. 8, 2013

(65) Prior Publication Data
US 2015/0002375 A1 Jan. 1, 2015

(30) Foreign Application Priority Data
Jan. 30, 2012 (GB) .................................. 1201527.7

(51) Int. Cl.
G09G 5/00 (2006.01)
G02B 27/01 (2006.01)
(Continued)

(52) U.S. Cl.
CPC ......... G02B 27/017 (2013.01); G02B 27/0189 (2013.01); G06F 3/012 (2013.01); G06F 3/013 (2013.01); G01S 5/163 (2013.01); G02B 2027/014 (2013.01); G02B 2027/0198 (2013.01)

(58) Field of Classification Search
CPC .......... G02B 2027/014; G02B 27/017; G02B 27/0189; G02B 2027/0198; G01S 5/163; G06F 3/013; G06F 3/012
See application file for complete search history.

(56) References Cited

U.S. PATENT DOCUMENTS

| 5,880,777 A | 3/1999 | Savoye et al. |
| 6,120,461 A | 9/2000 | Smyth |
| 2010/0091377 A1* | 4/2010 | Hedges ............. A42B 3/04 359/630 |

FOREIGN PATENT DOCUMENTS

| EP | 2341386 A1 | 7/2011 |
| WO | WO 2004/113991 A2 | 12/2004 |
| WO | WO 2011/073682 A1 | 6/2011 |

OTHER PUBLICATIONS

International Search Report and Written Opinion dated Mar. 18, 2013 issued in PCT/GB2012/053010.
(Continued)

Primary Examiner — Charles Hicks
(74) Attorney, Agent, or Firm — Scully, Scott, Murphy & Presser, P.C.

(57) ABSTRACT

A user (18) views a reference symbol (36) along a line of sight (28) intersected by an image intensifier (22), arranged to present an intensified image of a forward scene (26) to the eye (24) of the user (18), and an image display (14), arranged to display an image to the eye (24) of the user (18) overlaid on the intensified image. The user indicates alignment of first and alternate symbols generated at known positions on the image display (14) with the reference symbol (36) and the position of a helmet (16) carrying the image display (14) is determined by a helmet tracking system (30) for each alignment. A line of sight can be determined for each symbol alignment given the helmet (16) position and known location of the first and alternate symbols. These lines of sight can be used to determine the magnification factor of the forward scene (26) induced by the image intensifier (20). Accordingly, symbology generated and displayed on the image display (14) can be compensated for relative to the magnification factor.

13 Claims, 2 Drawing Sheets

(51) Int. Cl.
*G06F 3/01* (2006.01)
*G01S 5/16* (2006.01)

(56) References Cited

OTHER PUBLICATIONS

UK Search Report dated Apr. 24, 2012 issued in GB1201527.7.

Fuhrmann, Anton et al., "Fast Calibration for Augmented Reality", Proceedings of ACM Virtual Reality Software & Technology '99 (Dec. 20-22, 1999), pp. 166-167, Jan. 1, 1999, pp. 1-8.
Baillot, Yohan, "A Tracker Alignment Framework for Augmented Reality", Mixed and Augmented Reality, 2003, Proceedings of the the Second IEEE and AC M International Symposium (Oct. 7-10, 2003), pp. 142-150.
Zhao, Shun-Long, "The Research on Projective Visual System of Night Vision Goggles", Proceedings of the SPIE (2009), vol. 7384.

\* cited by examiner

IMAGE DISPLAY SYSTEMS

The present invention relates to an image display system, in particular, but not exclusively, an image display system for use with a helmet, and a method for aligning an image generated by an image display system including an image intensifier with a line of sight of a user of the image display system.

It is known that a helmet mounted image display system for use with aircraft may incorporate a helmet tracking system arranged to monitor the orientation of a helmet within the cockpit of the aircraft. The helmet tracking system allows symbology generated by the image display system to be stabilised with respect to movement of the head of a pilot wearing the helmet and a forward scene relative to the aircraft. Such symbology can be used to prompt or cue the pilot to look in a particular viewing direction or to observe a particular feature of the forward scene or fixed symbology can be used by the pilot to designate points of interest relative to the forward scene or to direct aircraft equipment using movement of the pilot's head.

So as to achieve such capabilities, it is necessary to determine the alignment of the image display system within the helmet frame of reference as determined by the helmet tracking system such that symbology can be accurately be displayed on the image display to the pilot.

A problem with an image display system that includes an image intensifier positioned between the image display and the forward scene is that the image intensifier can result in magnification of an intensified image of a forward scene. Therefore, an image generated by the image display may not correctly overlay the intensified image of the forward scene generated by the image intensifier.

According to a first aspect of the invention a method for aligning an image generated by an image display system including an image intensifier with a line of sight of a user of the image display system, includes the steps of:
a) displaying to the user a first symbol on an image display;
b) aligning the first symbol with a reference symbol;
c) recording movement of the image display to align the first symbol with the reference symbol;
d) displaying to the user at least one alternate symbol on the image display;
e) aligning the alternate symbol with the reference symbol;
f) recording movement of the image display to align the alternate symbol with the reference symbol;
g) determining magnification of a forward scene induced by the image intensifier from the recorded movement of the image display in steps c) and f).

As the location of the first and alternate symbols displayed on the image display are known and the position of the image display to align both the first and alternate symbols is determined, two lines of sight can be resolved, one each of the first and alternate symbols. In this manner, if the image intensifier induces a magnification factor on the forward scene, this will result in a reduced angular separation between the two lines of sight. This reduction in angular separation can be calibrated to provide a measure of the magnification factor induced on the forward scene by the image intensifier.

The method may include compensating the image generated to account for the magnification of the forward scene by the image intensifier.

The method may include providing a reference symbol that corresponds to the boresight of an aircraft.

The method may include aligning the first and alternate symbols with the reference symbol by the user donning the image display system and moving the head of the user to relocate the image display.

The method may further include providing a first or alternate stabilised symbol on the image display, once initial alignment between the first or alternate symbol and the reference symbol has been selected, further adjusting the alignment of the first or alternate stabilised symbol with the reference symbol to more accurately align the first or alternate stabilised symbol with the reference symbol.

The method may include performing the further adjustment of alignment of the first or alternate stabilised symbol using a manual control.

The method may include controlling the sensitivity to movement of the image display system required to align the first or alternate symbol or first or alternate stabilised symbol with the reference symbol.

The method may include repeating steps d) to f) by displaying to the user at least a third symbol on the image display and repeating step g) with recorded movement of the image display from original steps c) and f) and repeated step f) with the at least a third symbol displayed on the image display. The method may further include providing a third stabilised symbol on the image display, once initial alignment between the third symbol and the reference symbol has been selected, further adjusting the alignment of the third stabilised symbol with the reference symbol to more accurately align the third stabilised symbol with the reference symbol. The method may include performing the further adjustment of alignment of the third stabilised symbol using a manual control. The method may include controlling the sensitivity to movement of the image display system required to align the third symbol with the reference symbol.

According to another aspect of the invention an image display system includes an image intensifier arranged to intensify light emitted from a forward scene; an image display arranged to generate an image to be displayed to a user as an overlay on the intensified image; a reference symbol; a tracking system arranged to track movement of the image display; and a processor arranged to calculate magnification of the forward scene as induced by the image intensifier; wherein the image display is arranged to generate two or more alignment symbols at predetermined locations on the image display, the image display is arranged to be moved so as to align each alignment symbol in turn with the reference symbol whilst the tracking system records movement of the image display and the processor is arranged to generate a value for the magnification of the forward scene as induced by the image intensifier.

As the location of the first and alternate symbols displayed on the image display are known and the position of the image display to align both the first and alternate symbols is determined, two lines of sight can be resolved, one each of the first and alternate symbols. In this manner, if the image intensifier induces a magnification factor on the forward scene, this will result in a reduced angular separation between the two lines of sight. This reduction in angular separation can be calibrated to provide a measure of the magnification factor induced on the forward scene by the image intensifier.

The image display may be arranged to allow a user to move the image display so as to align each alignment symbol as viewed by the user in turn with the reference symbol whilst the tracking system records movement of the image display system.

The value for the magnification may be used to compensate the image to be generated by the image display such that the image more correctly overlays the intensified image of the forward scene. The value of the magnification may be used to compensate the image to be generated by the image display such the image overlaying the intensified image is conformal with the intensified image of the forward scene.

The reference symbol may be generated by a reference symbol generator. Alternatively, the reference symbol may generated by a head up display situated between the image display system and the forward scene. Alternatively, the reference symbol may be fixed indicia arranged between the image display system and the forward scene.

The image display and image intensifier may be arranged to be mounted upon or incorporated with a helmet. The image display system may be arranged to be carried by a vehicle, for example an aircraft, or a simulator for a vehicle.

The invention will now be described, by way of example only, with reference to the accompanying drawings, in which.

Figure 1:
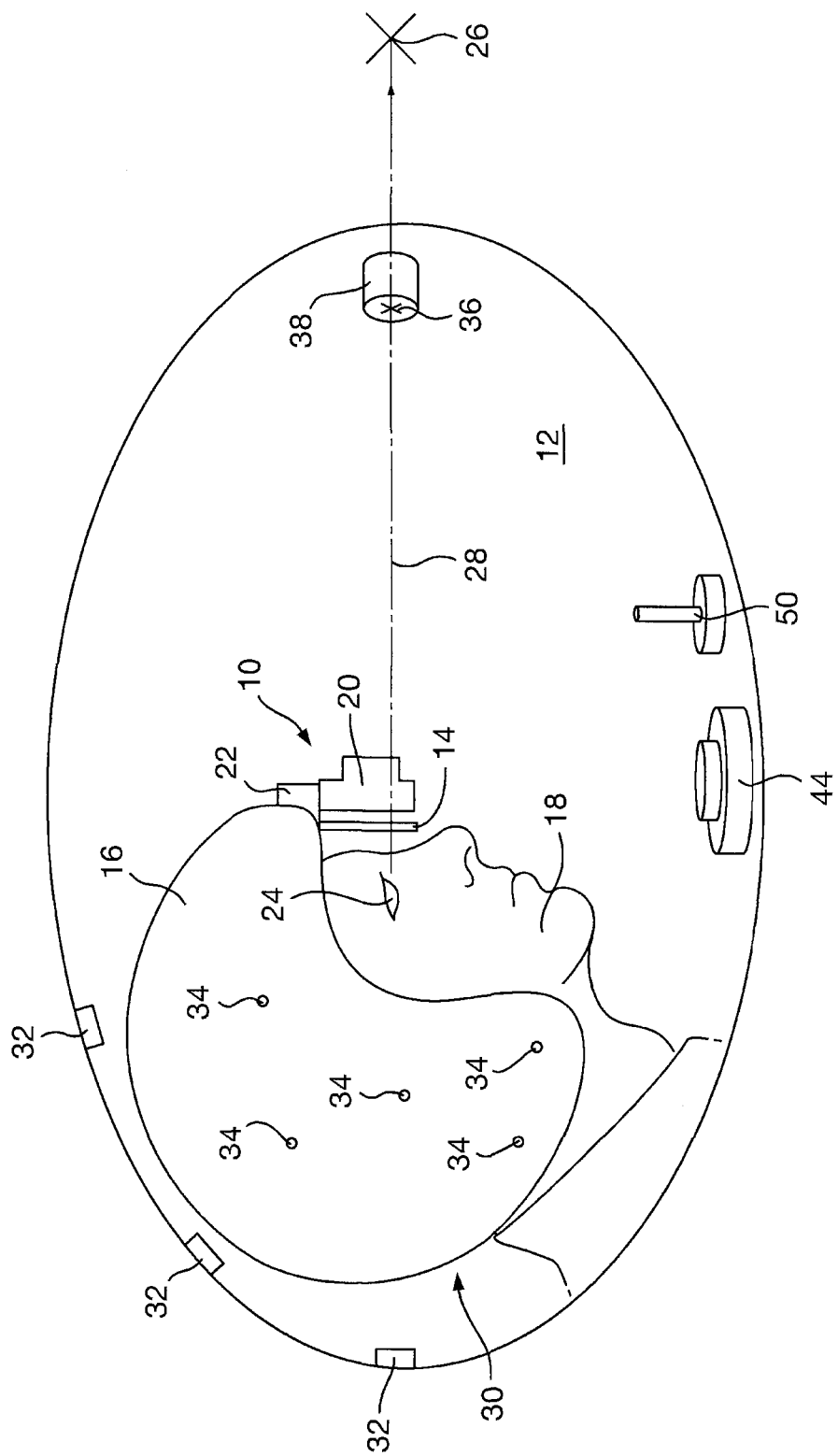
FIG. 1 is a schematic illustration of an image display system including a helmet mountable image display system mounted upon a helmet, a section of cockpit and a reference symbol.

Referring to FIG. 1, there is illustrated an image display system 10 arranged within a cockpit 12 of an aircraft (not shown). The image display system includes an image display 14 arranged to be mounted to a helmet 16 worn by a user 18, for example a pilot or aircrew member. The image display system 10 also includes an image intensifier 20, for example night vision goggles. The image display 14 and image intensifier 20 can be held in position with respect to the helmet 16 with a suitable support 22 arranged to maintain the image display 14 and image intensifier 20 in a stabilised position between at least one eye 24 of the user 18 and a forward scene 26 viewed by the user 18 along a line of sight 28 of the user 18. Accordingly, the image display 14 and image intensifier 20 intersect the line of sight 28 of the user 18.

The image display system 10 is arranged to display symbology to the user 18 via the image display 14. The symbology is focussed substantially at optical infinity when shown on the image display 14 so that the symbology remains viewable to the user 18 whilst the user 18 also views the forward scene 26. In this manner, the symbology appears overlaid on the forward scene 26 when viewed by a user 18. It will be understood that the image display system 10 includes an image driver or generator (not illustrated) to generate the symbols of the symbology and that the symbology can include flight information and warning symbols indicating to the user 18 conditions associated the flight of the aircraft or external to the aircraft. Furthermore, the symbology can include symbols that are required to be conformal with the forward scene 26 or located at a particular position with respect to the forward scene 26.

The image intensifier 20 is arranged to increase or enhance light emanating from the forward scene 26 to provide the user 18 with visibility of features and terrain otherwise not visible to the user 18 in ambient light conditions prevailing at the forward scene 26. It will be understood that the image display 14 allows light intensified by the image intensifier 20 to pass therethrough along the line of sight 28 to the eye 24 of the user 18.

The cockpit 12 also includes a helmet tracking system 30 having a plurality of sensors 32, for example cameras, disposed at known positions therein for monitoring the position of light emitting diodes 34 situated upon the exterior surface of the helmet 16. The light emitting diodes 34 are also positioned at known locations upon the helmet 16, such that the sensors 32 positioned within the cockpit 12 can monitor and track the position and orientation of the light emitting diodes 34 and thus the helmet 16, within the cockpit 12. It is to be appreciated that there are other helmet tracking systems available, such as a magnetic, acoustic and inertial tracking arrangements that could be used in place of an optical helmet tracking system.

A reference symbol 36 is generated by a boresight reticule unit 38 that is disposed at a known position and orientation within the cockpit 12 and is arranged to provide the reference symbol 36 along a known line of sight 28 within the cockpit 12. Alternatively, the reference symbol can be generated by a head up display (not illustrated) positioned within the cockpit 12 between the image intensifier 20 and the forward scene 26. As a further alternative, the reference symbol can be a suitable fixed indicia positioned within the cockpit.

It will be understood that a reference symbol 36 generated by a boresight reticule unit 38 or a head up display will be focussed at or near infinity and will provide a well-defined direction relative to the cockpit 12. Whereas, fixed indicia within the cockpit 12 is more prone to being observed from different direction by a user 18. As such, this will result in a poorly defined reference symbol 36 for determination of the lines of sight.

Once the helmet 16 has been donned by the user 18 and the image display 14 and image intensifier 20 have been positioned to intersect the line of sight 28 of the user 18, the user 18 can then proceed to align the image display system 10 with respect to the helmet 16 so that the symbology displayed on the image display 14 accurately overlays the intensified image of the forward scene generated by the image intensifier 20. As the helmet tracking system 30 tracks movements of the helmet 16 within the cockpit 12 the location and orientation of the helmet 16 can be determined. However, the position of the image display system 10 relative to the helmet 16 is not known. Accordingly, and as explained in detail below, the present arrangement determines the position of the helmet mounted image display 14 relative to the cockpit 12 and therefore the helmet tracking system 30 can be used to determine the location of the image display 14 within the cockpit 12. Furthermore, the helmet tracking system 30 can also be used to determine the magnification factor imposed by the image intensifier 20. It will be noted that a typical image intensifier 20 can impose a magnification factor of approximately 1.2 on the forward scene 26. Therefore, the symbology to be displayed on the image display 14 will need to be increased in size by a factor of 1.2 or alternatively repositioned or otherwise adjusted such that the symbology correctly overlays or is in conformity with the forward scene 26 viewed by the user 18.

Figure 2A:
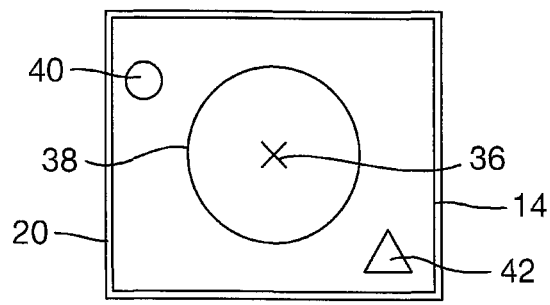
FIG. 2(a) is a view of the reference symbol, first symbol and alternate symbol as observed by a user of the image display system.
Figure 2B:
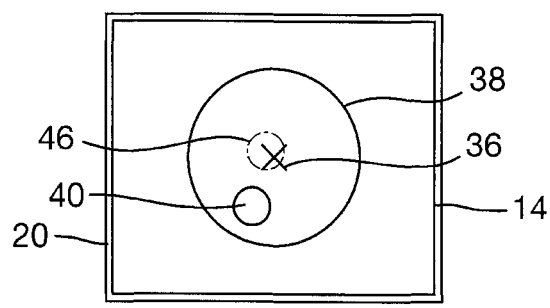
FIG. 2(b) is a view of the reference symbol, first symbol and a first stabilised symbol as observed by a user of the image display system.
Figure 2C:
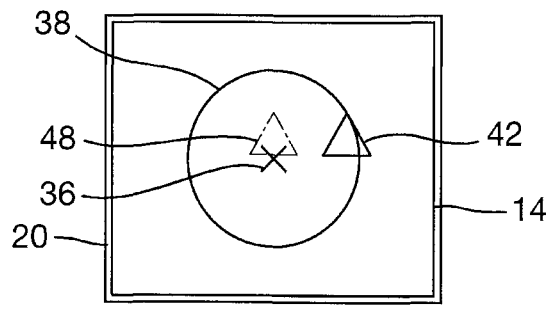
FIG. 2(c) is a view of the reference, alternate symbol and alternate stabilised symbol as observed by a user of the image display system.

Referring to FIG. 2 (a), wherein like references have been used to indicate similar integers to those illustrated in FIG. 1, there is illustrated the view as observed by a user along a line of sight extending perpendicular to the plane of the page. Accordingly, the user views the reference symbol 36 generated by the boresight reticule unit 38 through the image display 14 and image intensifier 20.

The image display 14 is arranged to display a first symbol 40 and an alternate symbol 42 at separate known locations upon the image display 14 and the user is primed or prompted to move their head so as to align the first symbol 40 with the reference symbol 36. Once alignment has been achieved, the user selects the aligned position by pressing a confirmation button 44, disposed within the cockpit 12 as illustrated in FIG. 1. During alignment of the first symbol 40 with the reference symbol 36, the helmet tracking system 30 records the tracked movement and orientation of the helmet 16 by monitoring the movement and orientation of light emitting diodes 34 on the helmet 16. The user 18 then uses head movement to align the alternate symbol 42 with the reference symbol 16 and similarly once alignment has been achieved the user selects the aligned position by pressing the confirmation button 44 disposed within the cockpit 12. During this subsequent head movement to align the alternate symbol 42 with the reference symbol 36, the helmet tracking system 30 further monitors and records the movement and orientation of the helmet 16 within the cockpit 12.

The monitored position and orientation of the helmet 16 at each selected alignment, together with the known line of sight 28 provided by the boresight reticule unit 38 enables a processor (not illustrated) associated with the image display system 10, to determine the alignment of the helmet mounted image display 14 with respect to the helmet 16 and determine the degree of magnification imposed by the image intensifier 20. Accordingly, the helmet tracking system 30 can then be used to track the movement of the image display 14 within the cockpit 12 and alter the image symbology to be displayed to the user 18 to account for the position of the image display 14 with respect to the helmet 16 and for magnification imposed by the image intensifier 20. It will be understood that the processor can be a bespoke device or part of the flight control computer for the aircraft.

The boresighting procedure as described with reference to FIGS. 1 and 2, yields two lines of sight, one associated with the first symbol 40 and the other associated with the alternate symbol 42. These lines of sight are both resolved by the processor into both tracked helmet axes and image display axes. In this manner, if the image intensifier 20 introduces a magnification factor, this will result in a reduced angular separation of the two lines of sight in the tracked helmet axes. Accordingly, head rotation undertaken by the user 18 between the two alignments, first symbol 40 with the reference symbol 36 followed by the alternate symbol 42 with the reference symbol 36, will be reduced compared to an image display system 10 without an image intensifier 20. Therefore, by comparing the angular separation of the two lines of sight as resolved into tracked helmet axes and image display axes, the magnification imposed by the image intensifier 20 can be determined and either a compensation factor feed to the image generator associated with the image display 14 to increase the size of the symbology image to be display so as to correctly overlay the intensified image or to reposition or otherwise adjust the symbology image displayed by the image display 14 such that the symbology image appears in the correct position on the intensified image of the forward scene 26.

It will be understood that third and subsequent symbols can be used to further enhance the alignment of the image display 14 with the reference symbol 36 and to improve calculation of the magnification factor induced by the image intensifier 20.

Referring to FIGS. 2 (*b*) and (*c*) there is illustrated another embodiment of the invention wherein like references have been used to indicate similar integers to those illustrated in FIGS. 1 and 2(*a*). FIGS. 2 (*b*) and (*c*) illustrate the view as observed by a user along a line of sight extending perpendicular to the plane of the page. A first stabilised symbol 46 is generated on the image display 14 upon selecting initial alignment of the first symbol 40 with the reference symbol 36, and is arranged to remain in the selected position. The user indicates initial alignment of the first symbol 40 and the reference symbol 36 by pressing the confirmation button 44. While maintaining an approximate alignment of the first symbol 40 with the reference symbol 36 is maintained, the user 18 uses a 2-axis manual control such as a joystick 50, to adjust the position of the first stabilised symbol 46 until it becomes more accurately aligned with the reference symbol 36. The user 18 then confirms the alignment by pressing the confirmation button 44 again. At this point, the position and orientation of the helmet 16 is determined by the helmet tracking system 30. This process is repeated for the alternate symbol 42 and an alternate stabilised symbol 48.

In more detail, the first symbol 40 is generated having a known fixed position on the image display 14. The user 18 moves the first symbol 40 by head movement so that the first symbol 40 is positioned over the reference symbol 36 and then presses the confirmation button 44 a first time.

When the confirmation button 44 is pressed, the image display 14 generates the first stabilised symbol 46 on the image display 14 approximately at the position of the image display 14 as the first symbol 40. The display of the first stabilised symbol 46 allows more accurate determination of the relative position between the image display 14 and the helmet 16. When the first stabilised symbol 46 is displayed, the user 18 continues to maintain the first symbol 40 approximately over the reference symbol 36 by keeping head movements to a minimum, whilst guiding the first stabilised symbol 46 onto the reference symbol 36 using manual control of the joystick 50. The first symbol 40 is fixed in position on the image display 14 so that head movements will cause the first symbol 40 to move relative to the reference symbol 36. However, the first stabilised symbol 46 is not fixed on the image display 14 and the image generator can change the position of the first stabilised symbol 46 on the display to compensate for head movements so that the first stabilised symbol 46 can be aligned with the reference symbol 36 generally independent of head movements. When the first stabilised symbol 46 is aligned with the reference symbol 36, the user 18 presses the confirmation button 44 a second time. The position and orientation of the helmet 16 is determined by the helmet tracking system 30 when the confirmation button 44 is activated a second time. Also the position of the first stabilised symbol 46 on the image display 14 is recorded.

Similarly, as shown in FIG. 2 (*c*), an alternate stabilised symbol 48 is generated on the image display 14 upon selecting the initial alignment of the alternate symbol 42 with the reference symbol 36, and is arranged to remain in the selected position. Again, the user's initial alignment of the alternate symbol 42 and the reference symbol 36 is indicated by pressing the confirmation button 44. While an approximate alignment of the alternate symbol 42 with the reference symbol 36 is maintained, the user 18 uses the joystick 50 to adjust the position of the alternate stabilised symbol 48 until it becomes more accurately aligned with the reference symbol 36. The alternate symbol 42 is fixed in position on the image display 14 so that head movement will cause the alternate symbol 42 to move relative to the reference symbol 36. However, the alternate stabilised symbol 48 is not fixed on the image display 14 and the image generator can change the position of the alternate stabilised symbol 48 on the image display 14 to compensate for head movements so that the alternate stabilised symbol 48 can be aligned with the reference symbol independent of user head movement. The user 18 then confirms the alignment by pressing the confirmation button 44 a second time and the position and orientation of the helmet 16 is determined by the helmet tracking system 30. Also, the position of the alternate stabilised symbol 48 on the image display 14 is recorded.

Accordingly, the movement of the helmet 16 during fine adjustment is nulled out so that alignment of the first stabilised symbol 46 and alternate stabilised symbol 48 with the reference symbol 36 can be determined independent of movement of the head of the user 18 and thus movement of the helmet 16 and mounted image display 14.

In this stabilised method, the first stabilised symbol 46 or alternate stabilised symbol 48 can be fully or partially stabilised. With partial stabilisation, head movement during alignment will be represented by some but reduced movement of the first stabilised symbol 46 or alternate stabilised symbol 48 relative to the reference symbol 36. In certain circumstances, such reduced movement can be sufficient to allow a user 18 to correctly align the first stabilised symbol 46 or alternate stabilised symbol 48 with the reference symbol 36.

Once both first and alternate stabilised symbols 46, 48 have been aligned with the reference symbol 36, the relative position of the image display 14 and the helmet 16 can be determined in azimuth, elevation and roll by the helmet tracking system 30.

The helmet tracking system 30 provides the recorded helmet 16 positions to the processor that then uses the helmet position information and location of each of the first and alternate stabilised symbols 46, 48 on the image display to determine two lines of sight. This information can be used to more accurately calibrate the alignment of the image display 14 with respect to the helmet 16 to which it is mounted. The processor calculates a line of sight for each stabilisation symbol 46, 48 which are resolved into both helmet axes and image display axes. In this manner, if the image intensifier 20 introduces a magnification factor, it will result in a reduced angular separation of the two lines of sight in the tracked helmet axes.

Again referring to FIGS. 2(b) and (c), in another embodiment of the present invention, the position of the first and alternate stabilised symbols 46, 48 upon the image display 14 is adjustable using head movement of the user 18 alone, without any requirement for a separate joystick 50. In this embodiment, the user 18 controls the sensitivity to movement of the first and alternate stabilised symbols 46, 48 with respect to corresponding head movement, such that relatively large, erratic head movements produce small, smooth movements of the first and alternate stabilised symbols 46, 48, thereby making it easier for the user 18 to more accurately align the first and alternate stabilised symbols 46, 48 with the reference symbol 36. It is envisaged that this sensitivity control can be predetermined or adjustable so that a user 18 can vary the sensitivity to suit a particular environment.

Upon positioning the first and alternate stabilised symbols 46, 48 more accurately over the reference symbol 36, the user 18 confirms the alignment by pressing the confirmation button 44. The helmet tracking system 30 records the position of the helmet 16 upon confirmation of alignment of the first and alternate stabilised symbols 46, 48 with the reference symbol. Processor uses the position information, together with recorded position of the first and alternate stabilised symbols 46, 48 on the image display 14 to determine lines of sight for the first and alternate symbols 40, 42. The processor can then use the calculated lines of sight to more accurately calibrate the alignment of the image display 14 with respect to the helmet 16 to which it is mounted. Furthermore, should the image intensifier 20 introduce a magnification factor to the intensified image of the forward scene 26, it will result in a reduced angular separation of the two lines of sight in the tracked helmet axes. The processor can then either adjust the size of symbology or reposition the symbology to be displayed on the image display 14 to account for the magnification factor of the intensified image of the forward scene 26.

In more detail, and referring first to FIG. 2b, the first symbol 40 is generated having a fixed and predetermined position on the image display 14. The user 18 moves the first symbol 40 by head movements so that the first symbol 40 is over the reference symbol 36 and then presses the confirmation button 44 a first time.

When the confirmation button 44 is pressed, a first stabilised symbol 46 is then displayed on the image display 14 approximately at the position of the image display 14 as the first symbol 40. The display of the first stabilised symbol 46 allows more accurate determination of the relative position between the image display 14 and the helmet 16. When the first stabilised symbol 46 is displayed, the first symbol 40 can be removed from the display or alternatively the first symbol 40 can simply become the first stabilised symbol 46. Whilst the first symbol 40 is fixed in position on the image display 14 so that head movements will cause commensurate movement of the first symbol 40 relative to the reference symbol 36, the first stabilised symbol 46 is not fixed on the image display 14 and the image generator can change the position on the image display 14 to reduce the effect of user head movements. That is, the effect of head movements are geared down so that for a given head movement the first stabilised symbol 46 is moved across the image display 14 to produce a commensurately reduced movement of the first stabilised symbol 46 relative to the reference symbol 36. When the first stabilised symbol 46 is aligned with the reference symbol 36, the user 18 presses the confirmation button 44 a second time. The position and orientation of the helmet 16 is determined by the helmet tracking system 30 when the confirmation button is activated a second time. Also the position of the first stabilised symbol 46 on the image display 14 is recorded.

Again, a similar process is conducted for the alternate stabilised symbol 48 to provide the position of the helmet 16 and the position of the alternate symbol 48 on the image display when the confirmation button is activated a second time. As in the previously described embodiments of the invention, the processor can determine two lines of sight from the position information of the helmet 16 and the location of the first and alternate stabilised symbols 46, 48 when they were aligned with the reference symbol 36. Accordingly, the processor can then either adjust the size of symbology or reposition the symbology to be displayed on the image display 14 to account for the magnification factor of the intensified image of the forward scene 26.

In this manner, the movement of the helmet 16 during fine adjustment of the alignment of the first and alternate stabilised symbols 46, 48 on image display 14 with the reference symbol 36 is nulled so that alignment and the magnification factor induced by the image intensifier can be determined independent of user head movement.

According to another embodiment of the present invention, the position of the first and alternate stabilised symbols 46, 48 upon the image display 14 is adjustable using either movement of the joystick 50 and movement of the head of the user 18, such the user 18 can choose which of the joystick 50 or head movement to use to align the first and alternate stabilised symbols 46, 48 with the reference symbol 36. Moreover, it is envisaged that the sensitivity control (not shown) may be applied to the joystick 50 in addition to movements of the head of the user 18.

It will be understood that at least a third stabilised symbol can be used with a corresponding third symbol to improve the accuracy of the alignment and magnification factor induced by the image intensifier 20 calculated using the first and alternate symbols 40, 42 and corresponding first and alternate symbols 46 and 48.

Generally, the alignment and determination of the magnification procedure is performed by users 18, for example aircrew, at the beginning of a flight and may be repeated as required during the flight of an aircraft. Accordingly, it is important that the procedure is quick and easy for a user 18 to implement to mitigate conflict with duties to be performed by the user 18.

From the foregoing therefore, it is evident that the method and system of the present invention provide for a rapid alignment of helmet mountable image display 14 with respect to a helmet 16, by eliminating the requirement to align the image display in 3-axes simultaneously, to compensate for undesirable head movements during alignment, to determine the magnification factor imposed by the image intensifier 20 and to compensate or position the image to be displayed to the user 18 so as to more correctly overlay or conform with a forward scene 26 viewed by the user 18.

It will be understood the image display system can be used on an aircraft or other vehicle or simulator for an aircraft or vehicle.

The invention claimed is:

1. A method for aligning an image generated by an image display system including an image intensifier with a line of sight of a user of the image display system, including the steps of:
    a) displaying to the user a first symbol on an image display;
    b) aligning the first symbol with a reference symbol by head movement;
    c) recording the head movement to align the first symbol with the reference symbol;
    d) displaying to the user at least one alternate symbol on the image display;
    e) aligning the alternate symbol with the reference symbol by head movement;
    f) recording the head movement to align the alternate symbol with the reference symbol;
    g) determining magnification of a forward scene induced by the image intensifier based on the recorded head movements in steps c) and f).

2. The method according to claim 1, including compensating the image generated to account for the magnification of the forward scene by the image intensifier.

3. The method according to claim 1, including providing a reference symbol that corresponds to the boresight of an aircraft.

4. The method of claim 1, further including providing a first or alternate stabilised symbol on the image display, once initial alignment between the first or alternate symbol and the reference symbol has been selected, further adjusting the alignment of the first or alternate stabilised symbol with the reference symbol to more accurately align the first or alternate stabilised symbol with the reference symbol.

5. The method of claim 4, including performing the further adjustment of alignment of the first or alternate stabilised symbol using a manual control.

6. The method of claim 4, including controlling the sensitivity to movement of first or alternate stabilised symbol with the reference symbol with respect to the head movement or a manual control.

7. The method of claim 1, including repeating steps d) to f) by displaying to the user at least a third symbol on the image display and repeating step g) with recorded head movement from original steps c) and f) and repeated step f) with the at least a third symbol displayed on the image display.

8. An image display system, including:
    an image intensifier arranged to intensify light emitted from a forward scene;
    an image display arranged to generate an image to be displayed to a user as an overlay on the intensified image;
    a reference symbol;
    a tracking system arranged to track movement of a helmet; and
    a processor arranged to calculate magnification of the forward scene as induced by the image intensifier;
    wherein the image display is arranged to generate two or more alignment symbols at predetermined locations on the image display, each alignment symbol configured to move as viewed by the user with the movement of a head of the user, where the tracking system tracks and records the movement of the head when each alignment symbol is in turn aligned with the reference symbol and the processor is arranged to generate a value for the magnification of the forward scene as induced by the image intensifier based on the recorded head movements.

9. An image display system, as claimed in claim 8, wherein the value for the magnification is used to compensate the image to be displayed on the image display such that the image more correctly overlays the intensified image of the forward scene.

10. An image display system, as claimed in claim 8, wherein the value of the magnification is used to compensate the image to be displayed on the image display such the image overlaying the intensified image is conformal with the intensified image of the forward scene.

11. An image display system, as claimed in claim 8, wherein the reference symbol is generated by a reference symbol generator.

12. An image display system, as claimed in claim 8, wherein the reference symbol is generated by a head up display situated between the image display system and the forward scene.

13. An image display system, as claimed in claim 8, wherein the reference symbol is fixed indicia arranged between the image display system and the forward scene.

* * * * *